No. 685,823. Patented Nov. 5, 1901.
F. COWIN.
EVAPORATING APPARATUS.
(Application filed June 17, 1901.)
(No Model.) 3 Sheets—Sheet 1.

WITNESSES: INVENTOR
Chas. H. Borchers Frederick Cowin
Glen C. Stephens BY
 Rummler & Rummler,
 his ATTORNEYS No. 685,823. Patented Nov. 5, 1901.
F. COWIN.
EVAPORATING APPARATUS.
(Application filed June 17, 1901.)
(No Model.) 3 Sheets—Sheet 2.

WITNESSES:
Chas. H. Borcher.
Glen C. Stephens

INVENTOR:
Frederick Cowin
BY
Rummler & Rummler,
his ATTORNEYS.

No. 685,823. Patented Nov. 5, 1901.
F. COWIN.
EVAPORATING APPARATUS.
(Application filed June 17, 1901.)

(No Model.) 3 Sheets—Sheet 3.

WITNESSES:
Chas. H. Borchers
Glen C. Stephens

INVENTOR
Frederick Cowin,
BY
Rummler & Rummler,
his ATTORNEYS.

UNITED STATES PATENT OFFICE.

FREDERICK COWIN, OF CHICAGO, ILLINOIS, ASSIGNOR TO THE ANGLO-AMERICAN PROVISION COMPANY, OF CHICAGO, ILLINOIS, A CORPORATION OF ILLINOIS.

EVAPORATING APPARATUS.

SPECIFICATION forming part of Letters Patent No. 685,823, dated November 5, 1901.

Application filed June 17, 1901. Serial No. 64,773. (No model.)

*To all whom it may concern:*

Be it known that I, FREDERICK COWIN, a citizen of the United States of America, and a resident of Chicago, in the county of Cook and State of Illinois, have invented certain new and useful Improvements in Evaporating Apparatus, of which the following is a specification.

The main object of my invention is to provide an improved device for economically concentrating and solidifying a liquid by a continuous process of evaporation and drying, in which the same heat is utilized for evaporating or concentrating a liquid within a receptacle and drying the concentrated liquid upon the outer surface of the receptacle. I accomplish these objects by the device shown in the accompanying drawings, in which—

Figure 1:
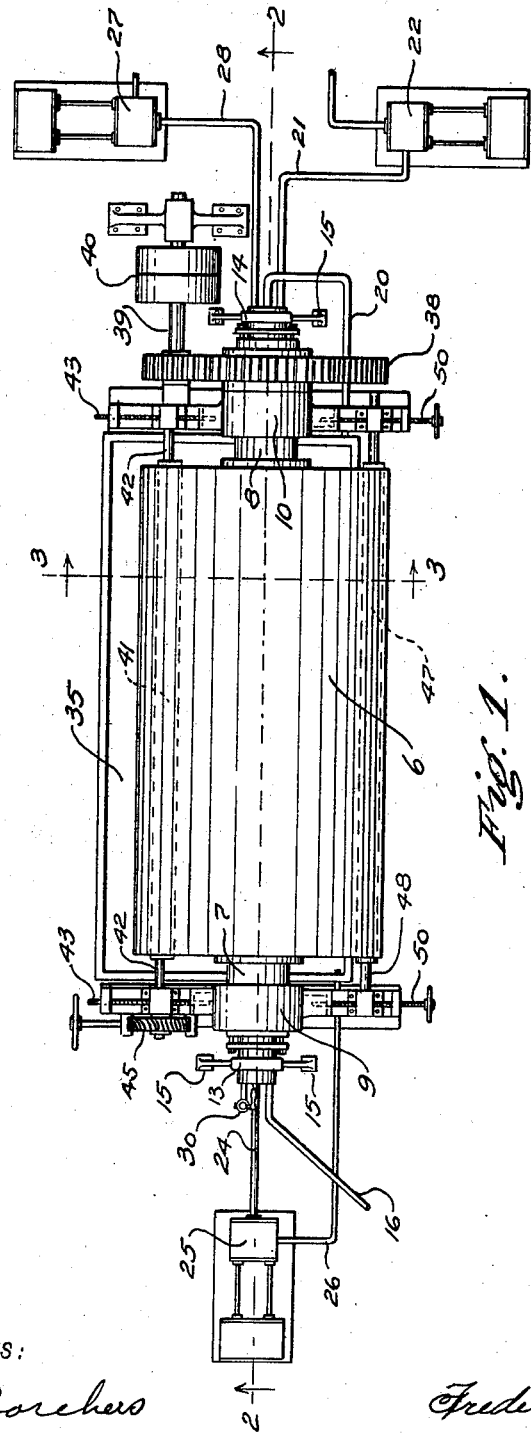
Figure 2:
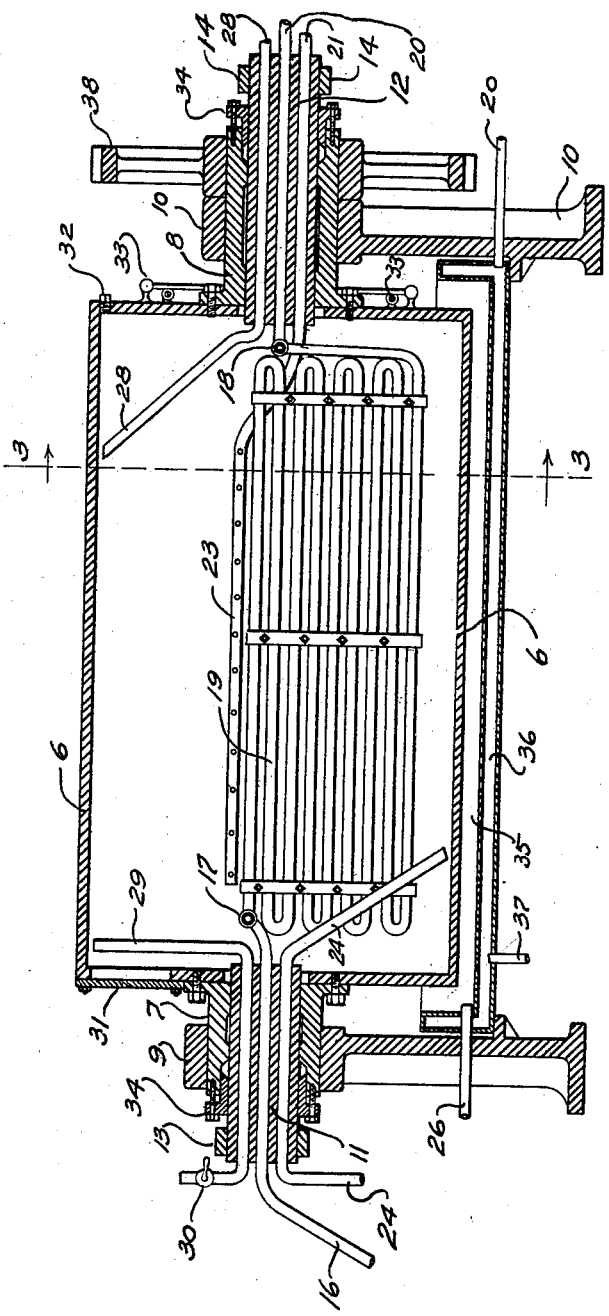
Figure 3:
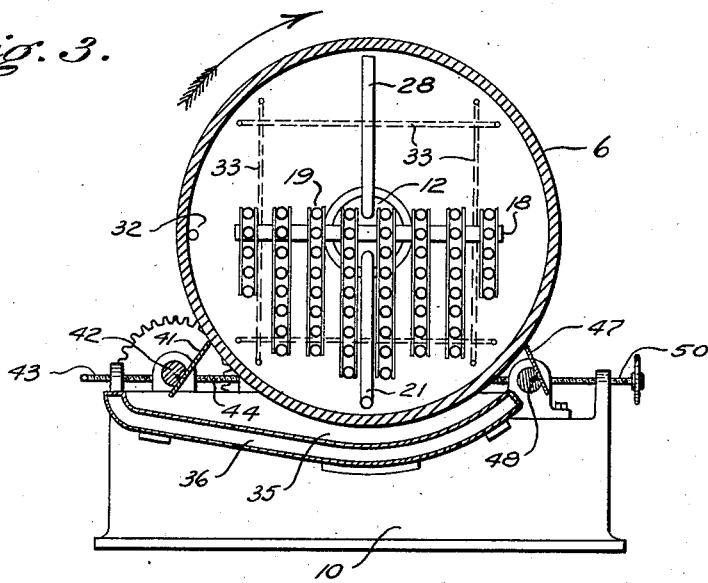
Figure 4:
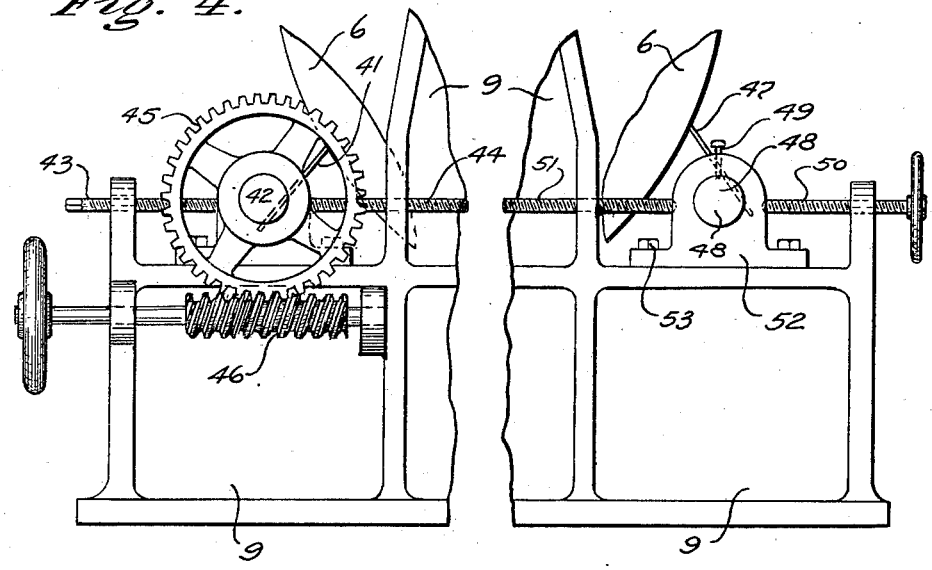

Figure 1 is a top plan view of a machine constructed according to my invention, showing the general arrangement of its elements and the system of piping. Fig. 2 is a vertical longitudinal section along the line 2 2 of Fig. 1. Fig. 3 is a transverse vertical section along the line 3 3. Fig. 4 is an end elevation, partly broken away, showing means of adjustment of the scrapers.

In the form shown my device is constructed as follows: A hollow cylinder 6 is mounted on the hollow sleeves 7 and 8 and journaled in the frames 9 and 10, so as to be revoluble with said sleeves about a horizontal axis. Journaled centrally in the sleeves 7 and 8 are the shafts 11 and 12. These shafts are secured against rotation by the straps 13 and 14, which are connected to bed-plates 15 on the floor. Each of the shafts 11 and 12 has extending longitudinally through same three apertures, through which pipes lead to the interior of the cylinder. One of these pipes 16, leading through the shaft 11, terminates in the header or manifold 17. A second header 18 is connected with the header 17 by a series of heating-coils 19 and has leading from it a pipe 20, which passes through the shaft 12. A pipe 21, leading from the liquid-supply pump 22, passing through one of the apertures in the shaft 12, and extending into the cylinder 6 above the coils, serves to supply the cylinder with the liquid that is to be dried. The part 23 of the pipe 21 has a series of openings in its sides, so that the incoming liquid will be equally distributed throughout the length of the cylinder. The pipe 24 leads upwardly from near the bottom of the cylinder, passes through the shaft 11, and connects with the pump 25. An air-pump 27 is connected by means of the pipe 28 with the upper part of the interior of the cylinder. The pipe 29, terminating in the air-cock 30, connects the upper part of the interior of the cylinder with the outer air for the purpose of admitting air to the cylinder. A manhole 31 is located in one end of the cylinder to permit of access to the interior for the purpose of erection and repair of the interior piping. The cylinder may be drained for cleaning purposes by removing the plug 32. Four gage-glasses 33 are arranged on one end of the cylinder to indicate the level of the liquid within. The joints between the sleeves 7 and 8 and the shafts 11 and 12 are made air-tight by means of the stuffing-boxes 34. A tank 35 is disposed horizontally below the cylinder 6 and adapted to contain a liquid in contact with the outer periphery of the cylinder 6. This tank is connected with the pump 25 by means of the pipe 26, so that the liquid may be drawn from the interior of the cylinder 6 and discharged into the tank 35. The outer surface of the tank is surrounded by a steam-jacket 36, which receives through the pipe 20 the exhaust-steam from the coils 19 and which in turn exhausts through the piping 37. The cylinder is caused to revolve on its journals by means of the gear 38, which is driven by a pinion on the counter-shaft 39, this counter-shaft receiving its power from a belt running on the tight and loose pulleys 40. A knife or blade 41, secured to the shaft 42, extends longitudinally above the tank and along one side of the cylinder and is adapted to regulate the thickness of the deposit of liquid taken up by the outer surface of the cylinder as it revolves in contact with the liquid in the tank. This knife is arranged to be regulated transversely of said cylinder by means of the adjusting-screws 43 and 44. The distance of the edge of the knife from the surface of the cylinder is also regulated by rotating the knife and its shaft 42 by means of the wheel 45 and pinion 46. A second knife or scraper 47, mounted on the shaft 48 and extending longitudinally along the cylinder 6 on the side opposite to the shaft 42, serves as a scraper for removing the aforesaid deposit from the surface of the cylinder. This scraper 47 is held rigidly in its bearings by the set-screw 49 and is adjustable transversely of the cylinder by means of the adjusting-screws 50 and 51. The pillow-blocks 52 are secured to the frames 9 and 10 by bolts 53 resting in transverse slots in said frames.

The operation of my device is as follows: The liquid that is to be evaporated and dried is forced through the pipe 21 and into the cylinder 6 by the pump 22, the cylinder being filled to a level somewhat above the top of the coils 19. The cylinder is caused to revolve by power applied to the gear 38. The coils and interior piping being fixed in their positions remain in the relative positions shown in Fig. 2. Steam is admitted to the coils from the pipe 16 and the liquid is heated. The air and vapors above the liquid are exhausted by means of the air-pump 27, thus reducing the pressure on the liquid and causing same to evaporate rapidly and become concentrated. If at any time it is desirable to break the vacuum, this can be done by admitting the air through the air-cock 30. The concentrated liquid is withdrawn from the lower part of the cylinder by the pump 25 and is discharged into the tank 35, where it receives additional heat through the walls of the tank and is further concentrated. The liquid in the tank 35 is maintained at such a level as to be in contact with the surface of the cylinder 6. A coating or deposit is formed on the cylinder 6. The thickness of this coating is regulated by means of the blade 41. The coating receives further heat from the walls of the cylinder, the speed of revolution of the cylinder being regulated so that the deposit on the surface of the cylinder is dried by the time it reaches the scraper 47, by means of which it is removed from the surface and guided beyond the side of the tank, where it is allowed to fall upon the floor or into a receptacle placed for that purpose. It will be seen that the process is continuous and that the heat-supply is very economically used, serving both for concentrating the liquid and for heating the drying-surface.

It will be understood that numerous details of the device shown may be altered without departing from the spirit of my invention. I therefore do not confine myself to such details except as hereinafter limited in the claims.

What I claim as my invention, and desire to secure by Letters Patent, is—

1. In an evaporator and drier, the combination of a receptacle adapted to contain a liquid, a heater in said receptacle, means for drawing the liquid from said receptacle and means for supplying a film of said liquid on the outer surface of the receptacle, and a scraper acting on said outer surface for removing said film.

2. In an evaporator and drier, the combination of a movable receptacle adapted to contain a liquid, a heater in said receptacle, means for drawing the liquid from said receptacle and means for supplying a film of said liquid on the outer surface of the receptacle, and a scraper acting on said outer surface for removing the film.

3. In an evaporator and drier, the combination of a revoluble receptacle adapted to contain a liquid, a heater in said receptacle, means for drawing the liquid from said receptacle and means for supplying a film of said liquid on the outer surface of the receptacle, and a scraper acting on said outer surface for removing the film.

4. In an evaporator and drier, the combination of a revoluble cylinder adapted to contain a liquid, a heater in said cylinder, means for drawing the liquid from said receptacle and means for supplying a film of said liquid on the outer surface of the cylinder, and a scraper acting on said outer surface for removing the film.

5. In an evaporator and drier, the combination of a revoluble cylinder adapted to contain a liquid, a heater in said cylinder, means for drawing the liquid from said receptacle and means for supplying a film of said liquid on the periphery of the cylinder, and a scraper acting on said periphery for removing the film.

6. In an evaporator and drier, the combination of a cylinder revoluble on a horizontally-disposed axis and adapted to contain a liquid, a heater in said cylinder, a tank under said cylinder arranged to contain a liquid in contact with the lower part of the periphery of the cylinder, and means for drawing, the liquid from said cylinder and discharging same into said tank.

7. In an evaporator and drier, the combination of a cylinder revoluble on a horizontally-disposed axis and adapted to contain a liquid, a heater in said cylinder, a tank under said cylinder arranged to contain a liquid in contact with the lower part of the periphery of the cylinder, means for drawing the liquid from said cylinder and discharging same into said tank, and a scraper acting on the periphery of said cylinder.

8. In an evaporator and drier, the combination of a receptacle adapted to contain a liquid and having a supply-port and a discharge-port, a heater in said receptacle, means connected with said discharge-port for withdrawing liquid from said receptacle and means for supplying a film of said liquid upon the outer surface of the receptacle, and a scraper acting on said outer surface.

9. In an evaporator and drier, the combination of a receptacle adapted to contain a liquid and having a supply-port and a discharge-port, a heater in said receptacle, means connected with said discharge-port for withdrawing liquid from said receptacle and means for supplying a film of said liquid upon the outer surface of the receptacle, a scraper acting on said outer surface, and a vacuum-pump connected with the upper part of the receptacle for exhausting the air or vapor therefrom.

10. In an evaporator and drier, the combination of a cylinder revoluble on a horizontally-disposed shaft and adapted to contain a liquid, said shaft having apertures through same leading into the interior of the cylinder, a steam-conduit within the cylinder and having supply and exhaust connections through the apertures in said shaft, a liquid-supply conduit and a liquid-discharge conduit communicating with the interior of the cylinder through apertures in said shaft, and means connected with said liquid-discharge conduit for spreading the liquid upon the outer surface of the cylinder.

11. In an evaporator and drier, the combination of a cylinder revoluble on a horizontally-disposed shaft and adapted to contain a liquid, said shaft having apertures through same leading into the interior of the cylinder, a steam-conduit within the cylinder and having supply and exhaust connections through the apertures in said shaft, a liquid-supply conduit and a liquid-discharge conduit communicating with the interior of the cylinder through apertures in said shaft, means connected with said liquid-discharge conduit for spreading the liquid upon the outer surface of the cylinder, and a scraper acting upon said outer surface of the cylinder.

12. In an evaporator and drier, the combination of a cylinder revoluble on a horizontally-disposed shaft and adapted to contain a liquid, said shaft having apertures through same leading into the interior of the cylinder, a steam-conduit within the cylinder and having supply and exhaust connections through the apertures in said shaft, a liquid-supply conduit and a liquid-discharge conduit communicating with the interior of the cylinder through apertures in said shaft, means connected with said liquid-discharge conduit for spreading the liquid upon the outer surface of the cylinder, and a vacuum-pump connected with the upper part of the receptacle through one of the apertures, in said shaft, for exhausting the air or vapor from said receptacle.

13. In an evaporator and drier, the combination of a cylinder revoluble on a horizontally-disposed axis and adapted to contain a liquid, a heater in said cylinder, a tank under said cylinder arranged to contain a liquid in contact with the lower part of the periphery of the cylinder, means for drawing the liquid from said cylinder and discharging same into said tank, means for regulating the thickness of the film of liquid deposited upon said cylinder, and a scraper acting on the periphery of said cylinder for removing said film.

14. In an evaporator and drier, the combination of a cylinder revoluble on a horizontally-disposed axis and adapted to contain a liquid, a heater in said cylinder, a tank under said cylinder arranged to contain a liquid in contact with the lower part of the periphery of the cylinder, means for drawing the liquid from said cylinder and discharging same into said tank, means for heating the liquid in said tank, means for regulating the thickness of the film of liquid deposited upon said cylinder, and a scraper acting on the periphery of said cylinder for removing said film.

15. In an evaporator and drier the combination of a cylinder revoluble on a horizontally-disposed axis and adapted to contain a liquid, a heater in said cylinder, a tank under said cylinder arranged to contain a liquid in contact with the lower part of the periphery of the cylinder, means for drawing the liquid from said cylinder and discharging same into said tank, an adjustable blade for regulating the thickness of the film of liquid deposited upon said cylinder, and a scraper acting on the periphery of said cylinder for removing said film.

16. In an evaporator and drier, the combination of a cylinder revoluble on a horizontally-disposed shaft and adapted to contain a liquid, said shaft having apertures through same leading into the interior of the cylinder, a steam-conduit within the cylinder and having supply and exhaust connections through the apertures in said shaft, a tank arranged to contain a liquid in contact with the lower part of the periphery of said cylinder, said tank having a steam-space in its walls connected with the exhaust from the conduit in said cylinder, a liquid supply and discharge communicating with the interior of the cylinder through apertures in said shaft, said discharge leading into said tank, means for regulating the thickness of the deposit of said liquid on said cylinder, and means for removing said deposit.

Signed at Chicago this 11th day of June, 1901.

FREDERICK COWIN.

Witnesses:
BENJAMIN R. IRVING,
THOMAS J. FENTON.